(12) United States Patent  
Harper et al.

(10) Patent No.: US 8,638,259 B2  
(45) Date of Patent: *Jan. 28, 2014

(54) METHOD AND SYSTEM FOR PROVIDING ASSISTANCE DATA FOR A-GPS LOCATION OF HANDSETS IN WIRELESS NETWORKS

(75) Inventors: Neil Harper, Mangerton (AU); Martin Dawson, Wollongong (AU); Martin Thomson, Keiraville (AU)

(73) Assignee: Maple Acquisition LLC, Annapolis, MD (US)

( * ) Notice: Subject to any disclaimer, the term of this patent is extended or adjusted under 35 U.S.C. 154(b) by 292 days.

This patent is subject to a terminal disclaimer.

(21) Appl. No.: 12/873,470

(22) Filed: Sep. 1, 2010

(65) Prior Publication Data

US 2010/0328148 A1 Dec. 30, 2010

Related U.S. Application Data

(63) Continuation of application No. 12/050,794, filed on Mar. 18, 2008, now Pat. No. 7,800,530.

(60) Provisional application No. 61/012,319, filed on Dec. 7, 2007.

(51) Int. Cl.  
*G01S 19/06* (2010.01)

(52) U.S. Cl.  
USPC .................................................. 342/357.43

(58) Field of Classification Search  
USPC ............................................. 342/357.15, 43  
See application file for complete search history.

(56) References Cited

U.S. PATENT DOCUMENTS

| 3,150,372 A | 9/1964 | Groth, Jr. |
| 3,659,085 A | 4/1972 | Potter et al. |
| 4,728,959 A | 3/1988 | Maloney |
| 4,814,751 A | 3/1989 | Hawkins |

(Continued)

FOREIGN PATENT DOCUMENTS

| EP | 0984295 A | 3/2000 |
| EP | 1783509 A1 | 5/2007 |
| JP | 06-347529 | 12/1994 |
| WO | 2006088472 A1 | 8/2006 |

OTHER PUBLICATIONS

Hill, Jonathan, "The Principle of a Snapshot Navigation Solution Based on Doppler Shift"; ION GPS 2001; Salt Lake City UT; Sep. 11-14, 2001, p. 3044-3051 (Document in U.S. Appl. No. 12/050,794).

(Continued)

*Primary Examiner* — Harry Liu  
(74) *Attorney, Agent, or Firm* — Tarolli, Sundheim, Covell & Tummino LLP

(57) ABSTRACT

A system and method for determining the location of a wireless device. A boundary for an approximate area in which the wireless device is located is determined and a plurality of satellites may be determined as a function of the boundary. Assistance data is transmitted to the device which includes information from the plurality of satellites, and the location of the wireless device may be determined from the information. In one embodiment, if the number of the plurality of satellites is greater than a predetermined threshold then the number of satellites may be reduced as a function of one or more of the elevation of each satellite above the horizon, a distance between each satellite to one or more other satellites, and an altitude of each satellite.

22 Claims, 4 Drawing Sheets

(56) References Cited

U.S. PATENT DOCUMENTS

| | | |
|---|---|---|
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,543,813 A | 8/1996 | Araki et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 5,999,125 A | 12/1999 | Kurby |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,709 A | 8/2000 | Kuwabara |
| 6,097,959 A | 8/2000 | Yost |
| 6,101,178 A | 8/2000 | Beal |
| 6,108,555 A | 8/2000 | Maloney et al. |
| 6,108,558 A | 8/2000 | Vanderspool, II |
| 6,115,599 A | 9/2000 | Stilp |
| 6,115,605 A | 9/2000 | Siccardo et al. |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,269,246 B1 | 7/2001 | Rao et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,393,294 B1 | 5/2002 | Perez-Breva et al. |
| 6,400,320 B1 | 6/2002 | Stilp et al. |
| 6,407,703 B1 | 6/2002 | Minter et al. |
| 6,429,808 B1 | 8/2002 | King et al. |
| 6,449,486 B1 | 9/2002 | Rao |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,583,756 B2 | 6/2003 | Sheynblat |
| 6,591,112 B1 | 7/2003 | Siccardo et al. |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,371 B2 | 12/2003 | King et al. |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,782,265 B2 | 8/2004 | Perez-Breva et al. |
| 6,804,290 B1 | 10/2004 | King et al. |
| 6,825,805 B2 | 11/2004 | Rowitch |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,944,465 B2 | 9/2005 | Spain et al. |
| 6,952,158 B2 | 10/2005 | Kennedy, Jr. |
| 6,987,979 B2 | 1/2006 | Carlsson |
| 6,996,392 B2 | 2/2006 | Anderson |
| 7,019,690 B1 | 3/2006 | Pitt |
| 7,023,383 B2 | 4/2006 | Stilp et al. |
| 7,064,706 B2 | 6/2006 | King et al. |
| 7,116,987 B2 | 10/2006 | Spain, Jr. et al. |
| 7,138,943 B2 | 11/2006 | Sheynblat |
| 7,142,155 B2 | 11/2006 | Iwami |
| 7,167,713 B2 | 1/2007 | Anderson |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,271,765 B2 | 9/2007 | Stilp et al. |
| 7,340,259 B2 | 3/2008 | Maloney |
| 7,383,051 B2 | 6/2008 | Spain, Jr. et al. |
| 7,427,952 B2 | 9/2008 | Bull et al. |
| 7,433,652 B2 | 10/2008 | Durgin |
| 7,433,695 B2 | 10/2008 | Gordon et al. |
| 7,440,762 B2 | 10/2008 | Maloney et al. |
| 7,453,925 B2 * | 11/2008 | Keegan et al. ............... 375/148 |
| 7,460,505 B2 | 12/2008 | Spain |
| 7,593,738 B2 | 9/2009 | Anderson |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,796,966 B2 | 9/2010 | Bhattacharya et al. |
| 7,848,762 B2 | 12/2010 | Gordon et al. |
| 7,899,467 B2 | 3/2011 | Feuerstein et al. |
| 8,013,785 B2 | 9/2011 | Bhattacharya et al. |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,155,394 B2 | 4/2012 | Allegra et al. |
| 2002/0172223 A1 | 11/2002 | Stilp et al. |
| 2003/0011511 A1 | 1/2003 | King et al. |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |

(56) References Cited

U.S. PATENT DOCUMENTS

| | | |
|---|---|---|
| 2004/0043775 A1 | 3/2004 | Kennedy, Jr. et al. |
| 2004/0132466 A1 | 7/2004 | Kennedy, Jr. et al. |
| 2004/0203539 A1 | 10/2004 | Benes et al. |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1 | 6/2005 | Kennedy, Jr. et al. |
| 2005/0164712 A1 | 7/2005 | Kennedy, Jr. et al. |
| 2005/0164713 A1 | 7/2005 | Tang-Taye |
| 2005/0192026 A1 | 9/2005 | Carlson et al. |
| 2005/0212700 A1 | 9/2005 | Diggelen et al. |
| 2006/0003695 A1 | 1/2006 | Kennedy, Jr. et al. |
| 2006/0003775 A1 | 1/2006 | Bull et al. |
| 2006/0012515 A1 | 1/2006 | Park et al. |
| 2006/0030333 A1 | 2/2006 | Ward et al. |
| 2006/0046747 A1* | 3/2006 | Abraham et al. .......... 455/456.6 |
| 2006/0111840 A1 | 5/2006 | Diggelen et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2007/0236387 A1 | 10/2007 | Monnerat |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |

OTHER PUBLICATIONS

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. T0rrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

Rick Roberts, "Project: IEEE P802.15 Working Group for Wireless Personal Area Networks (WPANs)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

Y. Zhao, "Standardization of Mobile Phone Positioning for 3G Systems," IEEE Communications Magazine, Jul. 2002, pp. 108-116.

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

(56) References Cited

OTHER PUBLICATIONS

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

* cited by examiner

METHOD AND SYSTEM FOR PROVIDING ASSISTANCE DATA FOR A-GPS LOCATION OF HANDSETS IN WIRELESS NETWORKS

RELATED APPLICATIONS

The instant application is co-pending with and claims the priority benefit of U.S. Non-Provisional application Ser. No. 12/050,794, filed Mar. 18, 2008, which claims the priority benefit of U.S. Provisional Application No. 61/012,319, filed Dec. 7, 2007, the entirety of each are incorporated herein by reference.

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, the United States Federal Communications Commission ("FCC") has required that cellular handsets must be geographically locatable by the year 2001. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time.

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Traditionally, satellite coordinates and velocity have been computed inside the GPS receiver. The receiver obtains satellite ephemeris and clock correction data by demodulating the satellite broadcast message stream. The satellite transmission contains more than 400 bits of data transmitted at 50 bits per second. The constants contained in the ephemeris data coincide with Kepler orbit constants requiring many mathematical operations to turn the data into position and velocity data for each satellite. In one implementation, this conversion requires 90 multiplies, 58 adds and 21 transcendental function cells (sin, cos, tan) in order to translate the ephemeris into a satellite position and velocity vector at a single point, for one satellite. Most of the computations require double precision, floating point processing.

Thus, the computational load for performing the traditional calculation is significant. The mobile device must include a high-level processor capable of the necessary calculations, and such processors are relatively expensive and consume large amounts of power. Portable devices for consumer use, e.g., a cellular phone or comparable device, are preferably inexpensive and operate at very low power. These design goals are inconsistent with the high computational load required for GPS processing.

Further, the slow data rate from the GPS satellites is a limitation. GPS acquisition at a GPS receiver may take many seconds or several minutes, during which time the receiver circuit and processor of the mobile device must be continuously energized. Preferably, to maintain battery life in portable receivers and transceivers such as mobile cellular handsets, circuits are de-energized as much as possible. The long GPS acquisition time can rapidly deplete the battery of a mobile device. In any situation and particularly in emergency situations, the long GPS acquisition time is inconvenient.

Assisted-GPS ("A-GPS") has gained significant popularity recently in light of stringent time to first fix ("TTFF"), i.e., first position determination, and sensitivity requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network) including receivers with clear views of the sky that may operate continuously. This reference network may also be connected with the cellular infrastructure, may continuously monitor the real-time constellation status, and may provide data for each satellite at a particular epoch time. For example, the reference network may provide the ephemeris and the other broadcast information to the cellular infrastructure. In the case of D-GPS, the reference network may provide corrections that can be applied to the pseudoranges within a particular vicinity. As one skilled in the art would recognize, the GPS reference receiver and its server (or position determination entity) may be located at any surveyed location with an open view of the sky.

However, the signal received from each of the satellites may not necessarily result in an accurate position estimation of the handset or mobile device. The quality of a position estimate largely depends upon two factors: satellite geometry, particularly, the number of satellites in view and their spatial distribution relative to the user, and the quality of the measurements obtained from satellite signals. For example, the larger the number of satellites in view and the greater the distances therebetween, the better the geometry of the satellite constellation. Further, the quality of measurements may be affected by errors in the predicted ephemeris of the satellites, instabilities in the satellite and receiver clocks, ionospheric and tropospheric propagation delays, multipath, receiver noise and RF interference. In cases where a user with a GPS receiver obtains code-phase ranges with respect to a plurality of satellites in view, without consulting with any reference station, or where the user is at an unknown location, the user may be limited in methods to reduce the errors or noises in the ranges or even determine a position calculation.

Accordingly, there is a need for a method and apparatus for geographic location determination of a device that would overcome the deficiencies of the prior art. Therefore, an embodiment of the present subject matter provides a method for determining the location of a wireless device. The method comprises the steps of determining a boundary for an approximate area in which the wireless device is located and determining a plurality of satellites as a function of the boundary. Assistance data may also be transmitted to the device which includes information from the plurality of satellites, and the location of the wireless device may then be determined from the information. In an alternative embodiment, if the number of the plurality of satellites is greater than a predetermined threshold then the number of satellites may be reduced as a function of one or more of the elevation of each satellite above the horizon, a distance between each satellite to one or more other satellites, and/or an altitude of each satellite.

In another embodiment of the present subject matter a method is provided for estimating the location of a device. The method comprises the steps of determining a boundary for a region in which the device is located and determining one or more available satellites. Assistance data may be received from a communications network where the assistance data includes information from the one or more available satellites. A plurality of signals comprising one signal from each of the one or more available satellites may be received, and the location of the device may be determined as a function said plurality of signals. In an alternative embodiment, if the number of the one or more available satellites is greater than a predetermined threshold then the number of satellites may be reduced as a function of one or more of the elevation of each satellite above the horizon, a distance between each satellite to one or more other satellites, and/or an altitude of each satellite.

In still another embodiment of the present subject matter a system is provided for determining the location of a device from signals received from a plurality of GNSS satellites. The system comprises circuitry for determining a boundary for an approximate area in which a wireless device is located and circuitry for determining a first plurality of satellites as a function of the boundary. The system may also include a transmitter for transmitting assistance data to the wireless device where the assistance data may include information from the first plurality of satellites. The system may also comprise circuitry for determining the location of the wireless device from the information. In another embodiment of the present subject matter, the system may further comprise circuitry for determining a second plurality of satellites if the number of first plurality of satellites is greater than a predetermined threshold, where the second plurality of satellites may be a function of one or more of the elevation of each satellite above the horizon, a distance between each satellite to one or more other satellites, and/or an altitude of each satellite.

These embodiments and many other objects and advantages thereof will be readily apparent to one skilled in the art to which the invention pertains from a perusal of the claims, the appended drawings, and the following detailed description of the embodiments.

DETAILED DESCRIPTION

Figure 1:
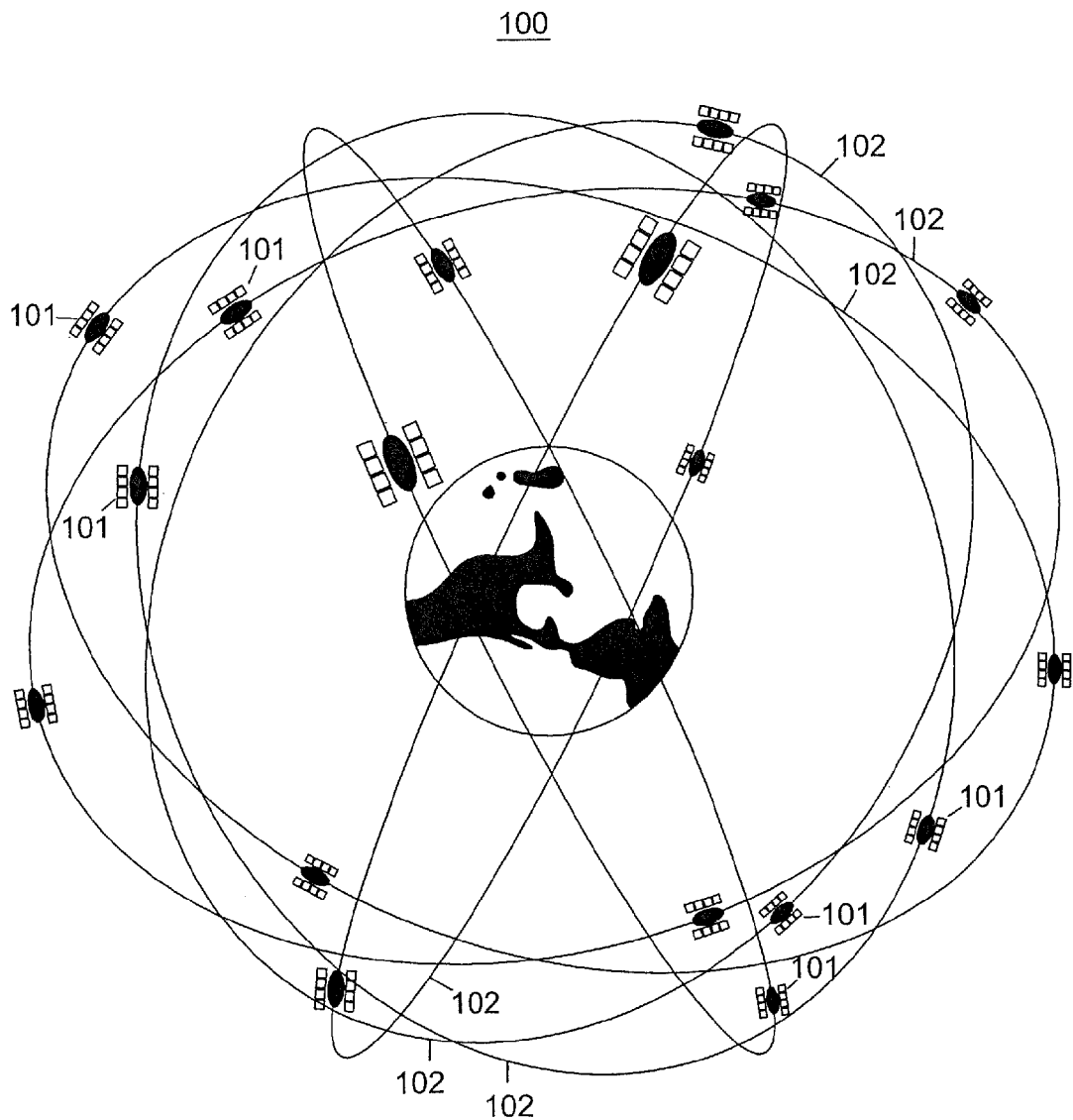
FIG. 1 is a schematic representation of a constellation of GPS satellites.

With reference to the figures where like elements have been given like numerical designations to facilitate an understanding of the present subject matter, the various embodiments of a system and method for determining the geographic location of a device and for providing assistance data for Assisted GPS ("A-GPS") location of devices in a wireless network or other region are herein described.

The disclosure relates to methods and apparatuses for determining geolocation using satellite signals and assistance data as well as for reducing or pruning satellite signals. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to the GPS system, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above.

Generally wireless A-GPS devices or handsets have a low time to first fix ("TTFF") as the devices are supplied with assistance data from an exemplary communications network to assist in locking onto or acquiring satellites quickly. Exemplary network elements that supply the assistance data may be a Mobile Location Center ("MLC") or other comparable network element.

Typical A-GPS information includes data for determining a GPS receiver's approximate position, time synchronization mark, satellite ephemerides, and satellite dopplers. Different A-GPS services may omit some of these parameters; however, another component of the supplied information is the identification of the satellites for which a device or GPS receiver should search. The MLC generally determines this information utilizing an approximate location of the device. Conventionally, this approximate location may be the location of the cell tower serving the device. The MLC may then supply the device with the appropriate A-GPS assistance data for the set of satellites in view from this conventional location.

This typical process performs well when the approximate location possesses a small uncertainty, such as, several hundred kilometers or less in the case with present cellular technology since the visible satellites for a device generally do not change significantly over these several hundred kilometers. However, when the approximate location possesses a larger uncertainty, such as, but not limited to, five hundred, one thousand or more kilometers in the case of satellite telephones, providing visible satellites from the center of an approximate area or region is generally inadequate for a quality position estimate of a respective device. For example, in conventional systems, if the device is near the perimeter of an area or region, there may be additional satellites in view of the device for which assistance data is not supplied. These additional satellites are generally not visible from the center of the area commonly utilized as a basis for including satellites.

While these additional satellites may be low on the horizon (e.g., between 10 and 30 degrees), these satellites are often quite valuable for a position calculation of the device as signals therefrom may improve the dilution of precision ("DOP") for a respective position calculation. DOP generally represents a measure of the geometric spread of the satellites that a receiver measures. Therefore, when measured satellites are evenly spread through the sky, a better DOP may be received and a more accurate location calculated.

Furthermore, in the event that the approximate location of a device is unknown or cannot be determined, conventional networks cannot determine satellites in view and generally may not supply the device with appropriate assistance data. Embodiments of the present subject matter allow a communications network to supply appropriate assistance data when the approximate location of a device is unknown or cannot be determined by utilizing the boundary of a predetermined region or area and/or the boundary of the communications network to determine satellites in view.

While an alternate implementation of the present subject matter would provide a device with assistance data for all satellites, network protocols generally limit the number of satellites that an exemplary MLC may provide assistance data for (e.g., Radio Resources Location Services Protocol ("RRLP") and Positioning Calculation Application Part ("PCAP") protocol allow a maximum of 16 satellites). Therefore, embodiments of the present subject matter may select satellites for assistance data as a function of probability and distribution and may also thin or prune such satellites as a function of their respective proximity to other satellites. It is thus an aspect of embodiments of the present subject matter to provide pertinent assistance data when the initial location uncertainty is large. This may then improve the yield and accuracy of a resulting location fix.

Various scenarios where embodiments of the present subject matter may be employed may be, but are not limited to, where the location of the device or handset is unknown and assistance data is requested by an A-GPS handset, e.g., when a new cell is added or renamed or where an MLC is serving a network where the MLC possesses no knowledge of the individual cell locations (such as, a bureau type operation where the MLC is serving several operators in one country without details of the specific cells).

In scenarios where an approximate location possesses a large uncertainty, the device or handset may not receive assistance data for critical satellites, and the resulting location of the device may be poor (i.e., a low DOP) or a location may not be calculated at all. In scenarios having an unknown location, embodiments of the present subject matter may consider the perimeter of the area or region in which the device or handset is located. This may be a location having a large uncertainty or in the case where the boundary is unknown, the location may be a city, municipality, state, country or continent. For example, in one non-limiting embodiment of the present subject matter, a series of points around the perimeter of the boundary of an area may be selected and the satellites in view from these points are determined. Additionally, as the number of visible satellites does not generally change within 100 km of a defined point, then any one or more of the series of points may be optimized and/or extrapolated to be this distance within the boundary to thereby reduce the number of points calculated.

In one embodiment of the present subject matter, visible satellites from a defined region may be determined and/or culled if there are more than the maximum number allowed by a respective protocol (e.g., RRLP, PCAP, etc.). Exemplary methods to cull or reduce satellites may include, but are not limited to, reducing satellites at elevations less than a predetermined threshold on the horizon, reducing or thinning adjacent satellites as a function of the distance therebetween, and/or reducing or thinning satellites having a high altitude (e.g., if altitude accuracy is of a lower importance).

In another embodiment of the present subject matter, satellites may be reduced by determining the position of any number or all of the satellites in a complete set in earth-centered earth fixed ("ECEF") coordinates and determining a distance between each satellite in the set. An exemplary distance may be, but is not limited to, a straight line distance, etc. Further, satellites may be reduced or removed from the set having a sum of the distances to any one or plural satellites that is at or below a predetermined minimum threshold. Of course, this process may be iteratively continued and/or the predetermined threshold adjusted until a sufficient number of satellites have been removed.

Figure 2:
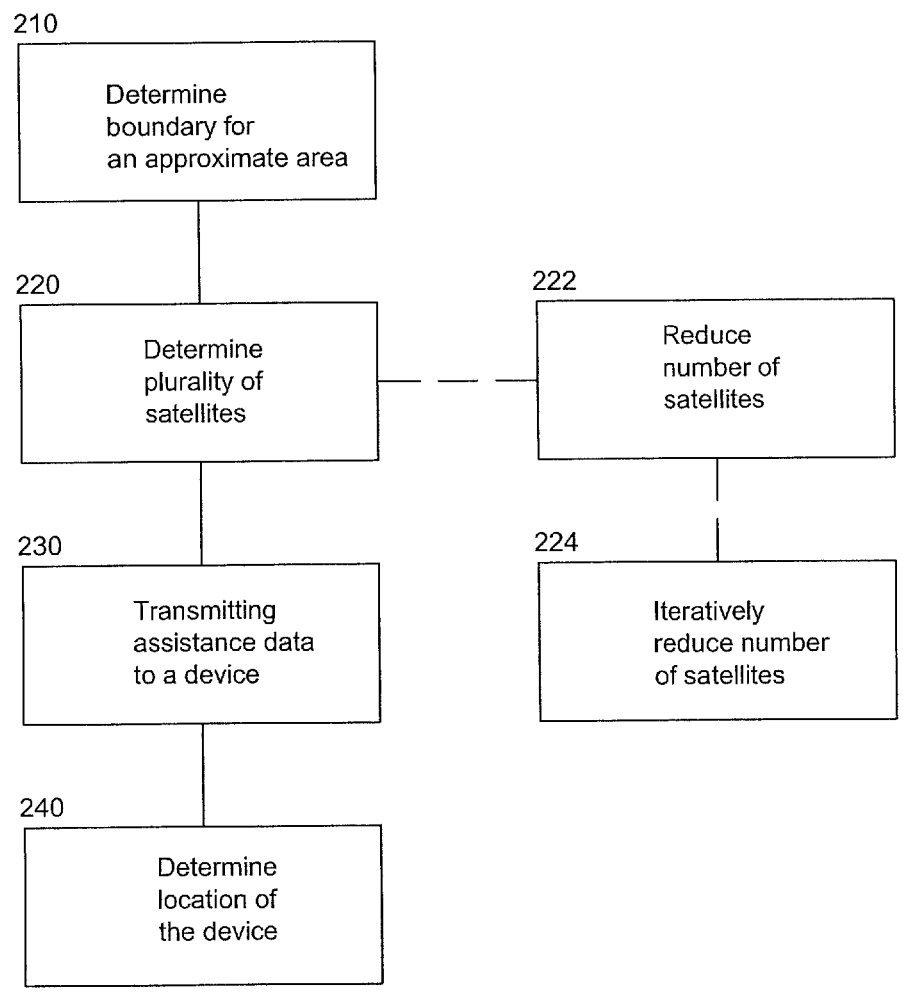
FIG. 2 is an algorithm according to one embodiment of the present subject matter.

FIG. 2 is an algorithm 200 according to one embodiment of the present subject matter. With reference to FIG. 2, at step 210, a boundary for an approximate area in which the wireless device is located may be determined. In certain embodiments of the present subject matter, the boundary may define a serving area of a base station serving the wireless device. However, the boundary may also define an approximate area of a communications network or an area or region such as, but not limited to, city, municipality, county, state, country, or continent. An exemplary device may be, but is not limited to, a cellular device, text messaging device, computer, portable computer, vehicle locating device, vehicle security device, communication device, and wireless transceiver. At step 220, a plurality of satellites may be determined as a function of the boundary. The satellites may be a part of a GNSS such as, but not limited to, GPS, Galileo, GLONASS, and QZSS. Assistance data may then be transmitted to an exemplary device in step 230 where the assistance data includes information from the plurality of satellites. At step 240, the location of the wireless device may then be determined from the information.

In another embodiment of the present subject matter, at step 222, if the number of the plurality of satellites is greater than a predetermined threshold then the number of satellites may be reduced as a function of one or more of the elevation of each satellite above the horizon, a distance between each satellite to one or more other satellites, and an altitude of each satellite. An exemplary distance may be, but is not limited to, a straight line distance. In a further embodiment, a satellite may be thinned or reduced from a set of satellites if the satellite possesses a sum of the distances to the two nearest satellites equal to or below a minimum predetermined threshold. In yet another embodiment of the present subject matter, at step 224, if the reduced number of the plurality of satellites is still greater than the predetermined threshold after a single iteration, then the number of satellites may be iteratively reduced until the number is less than or equal to the predetermined threshold. The predetermined threshold may be, but is not limited to, sixteen and may be a function of the respective protocol.

Figure 3:
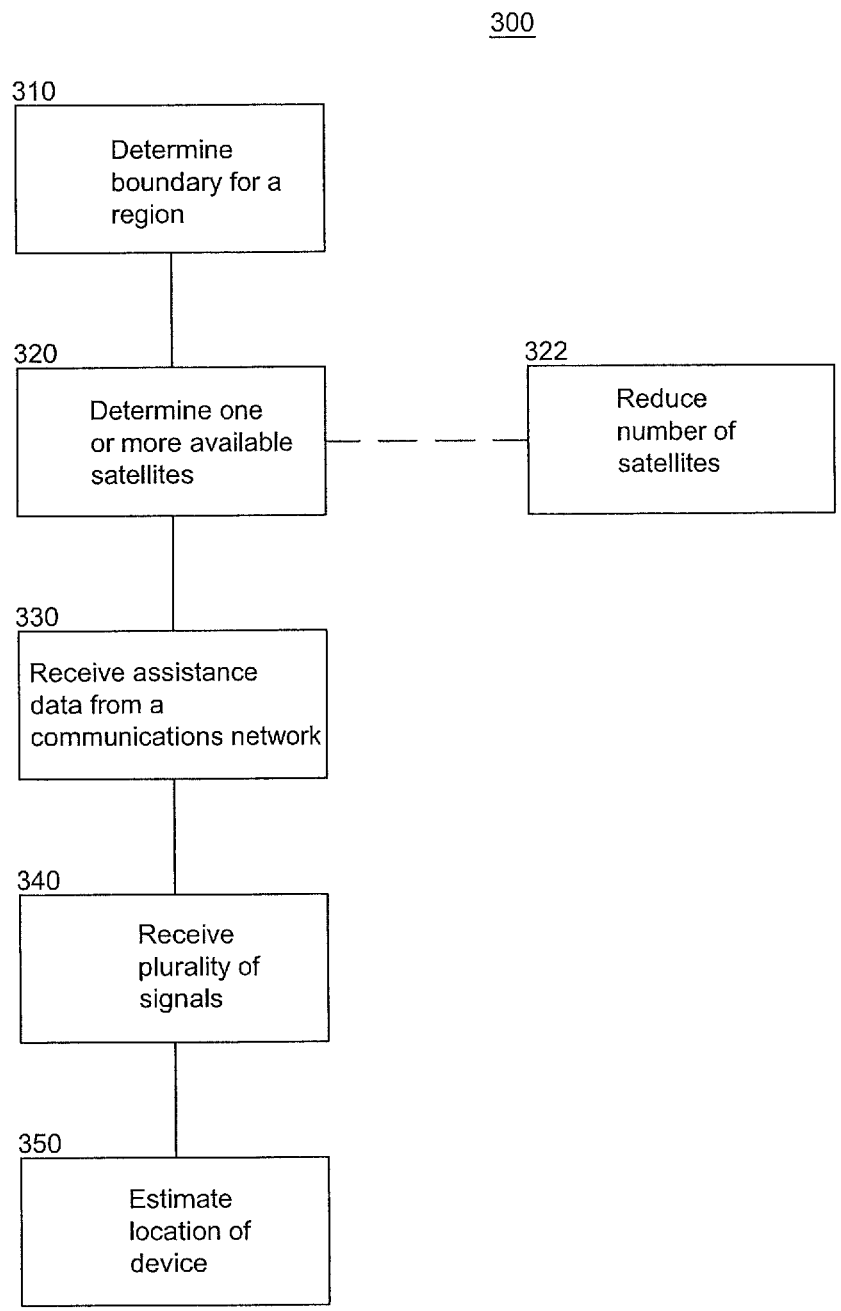
FIG. 3 is an algorithm according to another embodiment of the present subject matter.

FIG. 3 is an algorithm 300 according to another embodiment of the present subject matter. With reference to FIG. 3, in step 310, a boundary for a region in which the wireless device is located may be determined. In certain embodiments of the present subject matter, the boundary may define a serving area of a base station serving the wireless device or may define an approximate area of a communications network or an area or region such as, but not limited to, city, municipality, county, state, country, or continent. Exemplary devices may include a cellular device, text messaging device, computer, portable computer, vehicle locating device, vehicle security device, communication device, and wireless transceiver. At step 320, one or more available satellites may be determined. The satellites may be a part of a GNSS such as, but not limited to, GPS, Galileo, GLONASS, and QZSS.

Assistance data may then be received from a communications network in step 330 where the assistance data includes information from the one or more available satellites. At step 340, a plurality of signals may be received by the device comprising one signal from each of the one or more available satellites. The location of the device may then be determined as a function the plurality of signals at step 350. In another embodiment of the present subject matter, at step 322, if the number of the one or more available satellites is greater than a predetermined threshold then the number of satellites may be reduced as a function of one or more of the elevation of each satellite above the horizon, a distance between each satellite to one or more other satellites, and an altitude of each satellite. Of course, any number of iterations of this process may be conducted. An exemplary distance may be, but is not limited to, a straight line distance. The estimated location of the device may also be a function of signals provided by a cellular network.

Figure 4:
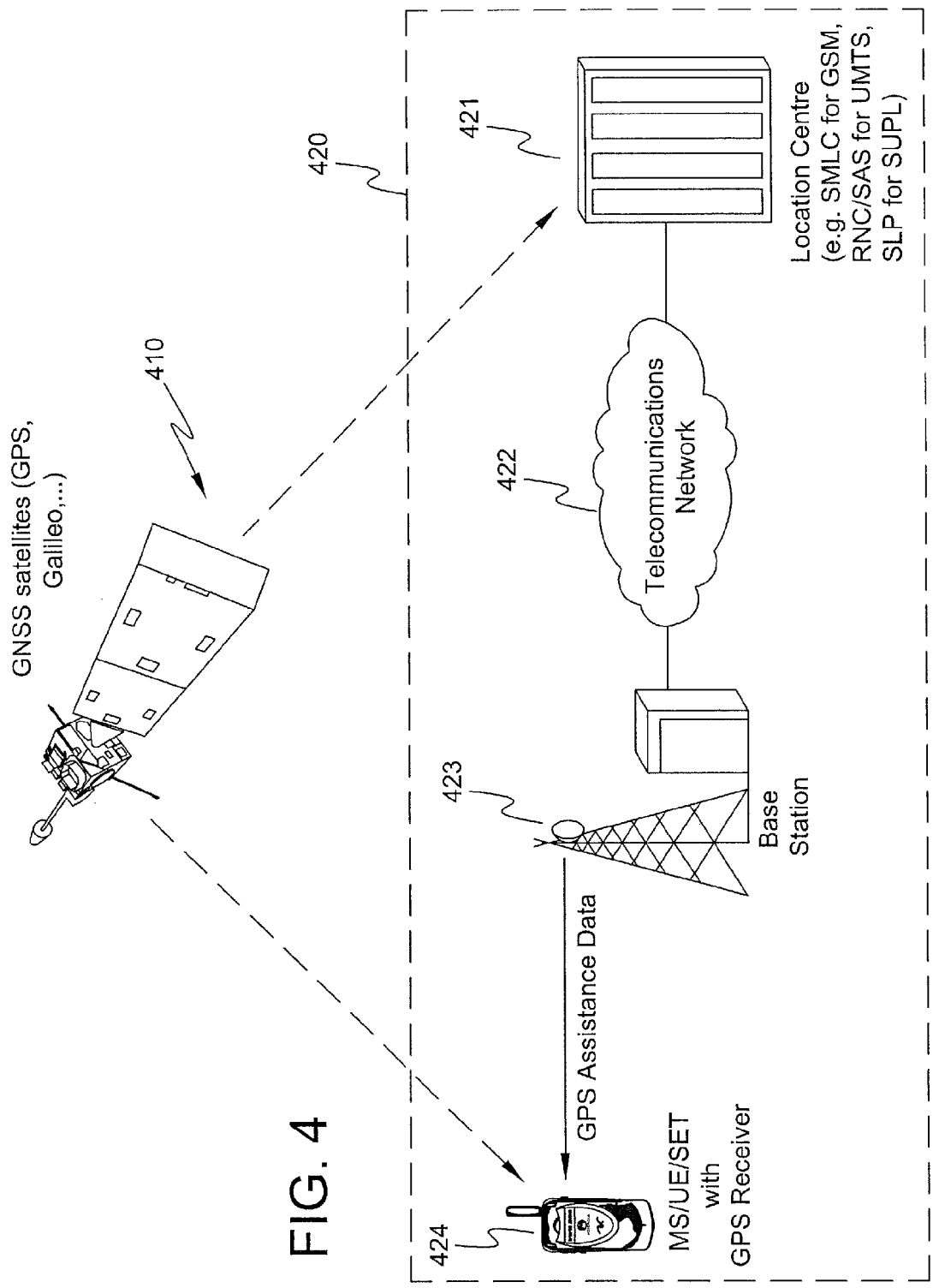
FIG. 4 is a schematic representation for implementing one embodiment of the present subject matter.

FIG. 4 is a schematic representation for implementing one embodiment of the present subject matter. With reference to FIG. 4, a satellite system 410 communicates with a ground system 420. The ground system 420 may include a cellular network having a location center 421. The location center 421 may be a Mobile Location Center (MLC) or a central office configured to communicate with a telecommunication network 422 and at least one base station 423. In one embodiment of the present subject matter, a device 424 communicates with the base station 423 to acquire GPS assistance data. The location center 421 may or may not receive a preliminary estimate of the receiver's location or boundary thereof on the basis of the receiver's cell site or other area, such as the boundary of the communications network or an area or region such as, but not limited to, city, municipality, county, state, country, or continent. The location center 421 may also determine a plurality of satellites as a function of this boundary or region. This information may then be transmitted or relayed to the mobile receiver and utilized for location determination. The location center 421 may also receive satellite information from GPS satellites. The satellite information may include the satellite's broadcast ephemeris information of the broadcasting satellite or that of all satellites or that of selected satellites. The location center 421 may relay the information back to the device 424 or use the information, either singularly or along with some preliminary estimation of the device's location, to assist the device in a geographic location determination. In another embodiment, any one or plural steps illustrated in FIGS. 2 and 3 may be implemented at the location center 421 and communicated to the device 424. Of course, the estimated location of the device 424 may also be determined as a function of additional signals provided by the network 422. Exemplary devices may be, but are not limited to, a cellular device, text messaging device, computer, portable computer, vehicle locating device, vehicle security device, communication device, and wireless transceiver.

As shown by the various configurations and embodiments illustrated in FIGS. 1-4, a method and system for determining the geographic location of a device have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for determining the location of a wireless device, comprising the steps of:
 (a) determining a boundary for an approximate area in which the wireless device is located;

(b) determining a plurality of satellites that are observable along said boundary;
(c) transmitting assistance data to said device, said assistance data including information from said plurality of satellites; and
(d) determining the location of the wireless device from said information, in response to receiving said assistance data.

2. The method of claim 1 wherein said boundary defines a serving area of a base station serving said wireless device.

3. The method of claim 1 wherein said boundary defines an approximate area of a communications network.

4. The method of claim 1 wherein said boundary defines an area selected from the group consisting of: city, municipality, county, state, country, and continent.

5. The method of claim 1 wherein the satellites are part of a Global Navigation Satellite System ("GNSS").

6. The method of claim 5 wherein the GNSS is selected from the group consisting of: Global Positioning System ("GPS"), Galileo, GLONASS, and Quasi-Zenith Satellite System ("QZSS").

7. The method of claim 1 wherein the device is selected from the group consisting of: cellular device, text messaging device, computer, portable computer, vehicle locating device, vehicle security device, communication device, and wireless transceiver.

8. The method of claim 1, wherein at least one satellite of the plurality of satellites that are observable along the boundary is not observable at a position in the approximate area in which the wireless device is located.

9. The method of claim 8, wherein the position is near a center of the approximate area in which the wireless device is located.

10. A method for estimating the location of a device, comprising the steps of:
   (a) determining a boundary for a region in which the device is located;
   (b) determining two or more available satellites that are observable along said boundary;
   (c) receiving, at the device, assistance data from a communications network, said assistance data including information from said two or more available satellites;
   (d) receiving, at the device, a plurality of signals comprising one signal from each of the two or more available satellites; and
   (e) estimating, at the device, a location of the device as a function of said plurality of signals.

11. The method of claim 10 wherein the estimated location of the device is a function of signals provided by a cellular network.

12. The method of claim 10 wherein the satellites are part of a Global Navigation Satellite System ("GNSS").

13. The method of claim 12 wherein the GNSS is selected from the group consisting of: Global Positioning System ("GPS"), Galileo, GLONASS, and Quasi-Zenith Satellite System ("QZSS").

14. The method of claim 10 wherein the device is selected from the group consisting of: cellular device, text messaging device, computer, portable computer, vehicle locating device, vehicle security device, communication device, and wireless transceiver.

15. The method of claim 10 wherein said region is a function of the location of a base station serving the device.

16. The method of claim 10 wherein said boundary is the boundary of the communications network.

17. The method of claim 10 wherein the boundary is the boundary of an area selected from the group consisting of: city, municipality, county, state, country, and continent.

18. A system for determining the location of a device from signals received from a plurality of Global Navigation Satellite System ("GNSS") satellites comprising:
   (a) circuitry for determining a boundary for an approximate area in which a wireless device is located;
   (b) circuitry for determining a first plurality of satellites that are observable along said boundary;
   (c) a transmitter for transmitting assistance data to said wireless device, said assistance data including information from said first plurality of satellites; and
   (d) circuitry for determining, at the wireless device, the location of the wireless device from said information included in said assistance data.

19. The system of claim 18 wherein the GNSS is selected from the group consisting of: Galileo, GLONASS, Quasi-Zenith Satellite System ("QZSS"), and Global Positioning System ("GPS").

20. The system of claim 18 wherein the device is adapted to receive signals from a cellular network.

21. The system of claim 18 wherein the estimated location of the device is determined as a function of signals provided by a cellular network.

22. The system of claim 18 wherein the device is selected from the group consisting of: cellular device, text messaging device, computer, portable computer, vehicle locating device, vehicle security device, communication device, and wireless transceiver.

* * * * *